United States Patent
Itou et al.

[19]

[11] Patent Number: 6,010,066

[45] Date of Patent: Jan. 4, 2000

[54] PORTABLE TERMINAL DEVICE WITH STACKABLE IC CARDS SLOT OPENING

[75] Inventors: Shinju Itou, Naka-gun; Yuhei Abe, Hitachinaka, both of Japan

[73] Assignee: Hitachi, Ltd., Tokyo, Japan

[21] Appl. No.: 08/921,612

[22] Filed: Sep. 2, 1997

[30] Foreign Application Priority Data

Sep. 24, 1996 [JP] Japan ................................. 8-251183

[51] Int. Cl.⁷ .................................................. G06F 17/60
[52] U.S. Cl. .......................... 235/379; 235/492; 235/380; 235/382; 902/25; 902/26; 902/10; 902/22; 361/737; 361/735
[58] Field of Search .................................. 235/492, 379, 235/380, 382, 493; 361/737, 735, 707–710; 902/25, 26, 10, 22

[56] References Cited

U.S. PATENT DOCUMENTS

| | | | |
|---|---|---|---|
| 4,277,837 | 7/1981 | Stuckert | 364/900 |
| 5,043,562 | 8/1991 | Hauvast et al. | 235/440 |
| 5,296,692 | 3/1994 | Shino | 235/486 |
| 5,434,395 | 7/1995 | Storck et al. | 235/380 |
| 5,544,014 | 8/1996 | Atsumi | 361/737 |
| 5,649,121 | 7/1997 | Budman et al. | 395/281 |
| 5,679,007 | 10/1997 | Potdevin et al. | 439/76.1 |
| 5,841,119 | 11/1998 | Rouyrre et al. | 235/380 |

*Primary Examiner*—Thien M. Le
*Assistant Examiner*—Daniel S. Felten
*Attorney, Agent, or Firm*—Antonelli, Terry, Stout & Kraus, LLP

[57] ABSTRACT

A portable terminal device for electronic money IC cards containing monetary data therein, includes in a main body (10): a card slot opening (12, or 12 and 13) into which a plurality of electronic money IC cards (100 and 110, or 100, 110 and 120) are inserted; electric contact terminals (16 and 17, or 16, 17 and 18) for reading and writing the monetary data from and into the electronic money IC cards which are inserted into the card slot opening; a display (80) for displaying money amount of the monetary data which is read out from inserted electronic money IC cards or which is to be written into the inserted electronic money IC cards; and a button (82) for manipulating the reading and writing operations of the monetary data from and into the electronic money IC cards which are inserted into the card slot opening; wherein the card slot opening (12, or 12 and 13) is so configured that the plurality of electronic money IC cards (100 and 110, or 100, 110 and 120) are inserted into and positioned while being closely piled up with each other and shifted to each other in a direction parallel to main surface thereof. Further, arrangements (heads) for reading/writing are positioned to contact ones of the electronic money IC cards at a same height from the surface of the devices substrate, and there is provided an arrangement for bending at least one of the electronic IC cards within the card slot opening.

13 Claims, 10 Drawing Sheets

PORTABLE TERMINAL DEVICE WITH STACKABLE IC CARDS SLOT OPENING

BACKGROUND OF THE INVENTION

1. Field of the Invention

The present invention relates to a portable terminal device in which electronic money IC cards memorizing electronic monetary information are inserted, and with which the electronic monetary information is read out and/or written into the cards.

2. Description of Relevant Art

As an example of prior arts relating to the present invention, such an terminal device for a IC card was already described, for example in Japanese Utility Model Laying-Open No. Hei 1-144957 (1989) entitled "A Reader and Writer For A IC Card Having A Door Structure". However, in accordance with the terminal device for a IC card of the prior art, only one IC card can be inserted into one card slot opening thereof. Therefore, with such the device, for inserting a plurality of IC cards into it so as to transfer data between them, there is necessity of further providing another card slot opening and another means or structure for establishing electrical connection between the device and the IC card inserted into the another slot opening, separately, thereby causing a drawback of enlarging the size of the device itself.

Further, as an another prior art relating to the present invention, in a terminal device described for example in Japanese Patent Laying Open No. Hei 6-20106 (1994) entitled "A Data Transfer System and A Data Transfer Terminal", there are provided two card slot openings in which two IC cards can be inserted separately. However, in the conventional terminal device, as mentioned in the above, the device itself becomes large in size, due to the increase in the number of the card slots and the interior structures thereof. The terminal device described in the prior art, however, is such a device which is inherently located in front of a store for the purpose of conducting payments on account electronically, therefore there is no consideration about portableness of the device.

Moreover, as a further prior art relating to the present invention, a portable terminal device also has been known, for example in Japanese Patent Laying-Open No. Hei 9-50497 (1997) entitled "A Transfer Device of Electronic Monetary Information", in which two IC cards are inserted into two card slot openings respectively. In the conventional portable terminal device, the two slot openings for insertion of the IC cards are provided on a front edge portion and a rear edge portion of the device, respectively, and one of the two IC cards is inserted into the front edge slot opening, and the other thereof into the rear edge slot opening. And within the device, those inserted IC cards are inserted and positioned on a same plane with abutting the front edges to each other, thereby reducing the thickness of the device and obtaining superiority in the portableness.

However, in general, with the portable terminal device mentioned above in which two IC cards are inserted, it is constructed with an assumption that monetary information of one of the IC cards are read out and the monetary information which is read out is transferred to the other IC card. In that case, it has a drawback that the IC card which is inserted into the rear edge slot opening can be easily dropped out from the slot because of small degree of insertion (i.e., it is not deeply inserted into the slot), according to the construction thereof. Further, regarding an operability of the portable device, in particular in insertion of the IC cards, there is no problem for the slot opening which is positioned on the front edge portion of the device. However, since the other slot opening is located on the rear edge portion (reverse side) of the device, the operation of inserting the IC card into the other slot opening is troublesome, and there is a problem in the operability of the device.

SUMMARY

Therefore, in accordance with the present invention, it is an object to dissolve the problems mentioned in the above, and in more particular, to provide a portable terminal device for electronic money IC cards, into which at least two electronic money IC cards can be inserted and with which monetary data of them can be transferred to and/or exchanged with each other.

Further, especially in accordance with the present invention, it is another object to provide a portable terminal device for electronic money IC cards, the construction of which is suitable for obtaining a small-sized terminal device, and for obtaining a portable terminal device for electronic money IC cards having a superior operability including the insertion of the electronic money IC cards.

For accomplishing the object mentioned above, in accordance with the present invention, there is provided a portable terminal device for electronic money IC cards containing monetary data therein, comprising: a card slot opening into which a plurality of electronic money IC cards are inserted; means for reading and writing the monetary data from and into said electronic money IC cards which are inserted into the card slot opening; means for displaying a money amount of the monetary data which is read out from said inserted electronic money IC cards or which is to be written into said inserted electronic money IC cards; and means for manipulating the reading and writing operations of the monetary data from and/or into said electronic money IC cards which are inserted into the card slot opening; wherein said card slot opening is so configured that the plurality of said electronic money IC cards are inserted into and positioned with being closely piled up while each other and shifted to each other in a direction parallel to main surface thereof.

Further, in accordance with the present invention, for accomplishing the above object, there is provided the portable terminal device for electronic money IC cards mentioned in the above, wherein said means for reading and writing the monetary data from and into said electronic money IC cards which are inserted are in plural and are positioned separately on a surface of a same substrate which is positioned in parallel to the main surface of said inserted electronic money IC cards within said card slot opening of the device.

Furthermore, in accordance with the present invention, for accomplishing the above object, there is provided the portable terminal device for electronic money IC cards mentioned in the above, wherein said card slot opening is a single slot opening.

Moreover, in accordance with the present invention, for accomplishing the above object, there is provided the portable terminal device for electronic money IC cards mentioned in the above, wherein a convex portion is provided within said card slot opening so as to position said electronic money IC cards shifting to each other at an edge portion thereof.

In addition thereto, in accordance with the present invention, for accomplishing the above object, there is provided a portable terminal device for electronic money IC cards mentioned in the above, wherein said card slot opening are provided in plural while being closely piled up with each other.

Furthermore, in accordance with the present invention, for accomplishing the above object, there is provided the portable terminal device for electronic money IC cards mentioned in the above, wherein said plural card slot opening are provided on a same side edge portion of the device.

Furthermore, in accordance with the present invention, for accomplishing the above object, there is provided the portable terminal device for electronic money IC cards mentioned in the above, wherein said plural card slot opening are provided on different side edge portions of the device which are perpendicular to each other.

Moreover, in accordance with the present invention, for accomplishing the above object, there is provided the portable terminal device for electronic money IC cards mentioned in the above, wherein said plural means for reading and writing the monetary data from and into said electronic money IC cards inserted into the card slot opening, are positioned at different heights on the surface of the substrate.

Moreover, in accordance with the present invention, for accomplishing the above object, there is provided the portable terminal device for electronic money IC cards mentioned in the above, wherein said plural means for reading and writing the monetary data from and into said electronic money IC cards inserted into the card slot opening, are positioned at a same height on the surface of the substrate, and further is provided means for bending at least one of said electronic money IC cards within said card slot opening.

And, in accordance with the present invention, for accomplishing the above object, there is provided the portable terminal device for electronic money IC cards mentioned in the above, wherein at least an opening is provided in a portion of an outside surface wall of the device which defines said card slot opening of the device, so as to push out the electronic money IC cards inserted into said card slot opening.

DETAILED DESCRIPTION OF PREFERRED EMBODIMENTS

Figure 1:
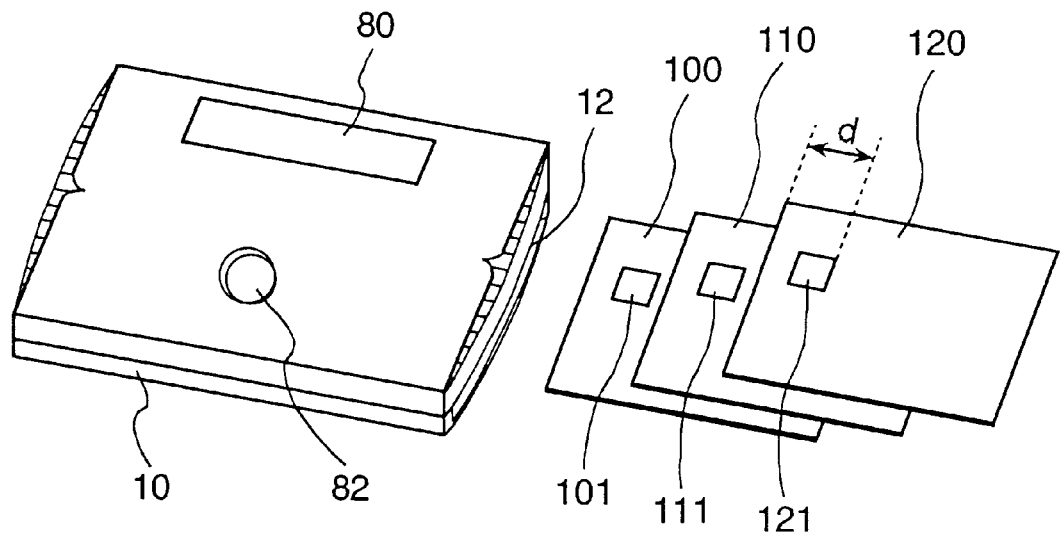
FIG. 1 perspective view showing an external configuration of a portable terminal device for electronic money IC cards in accordance with a first embodiment of the present invention.

In FIG. 1 showing the external view of a portable terminal device for electronic money IC cards in accordance with a first embodiment of the present invention, the portable terminal device for electronic money IC cards includes a main body 10 of a box type or shape, a display portion 80, a button for checking remaining amount of electronic money, i.e., monetary data. The main body 10 has a card slot opening 12 into which a plurality of electronic money IC cards (in this embodiment, for instance, three pieces of the IC cards) can be inserted.

With such a portable terminal device for electronic money IC cards, into the card slot opening 12 are inserted the plural electronic money IC cards 100, 110 and 120, and thereafter, by pushing the button 82 for checking the remaining money amount, i.e., remaining amount of the electronic money held in the inserted electronic money IC card can be displayed on the display portion 80, so as to be checked or ascertained by a user thereof. The display portion 80 can be constructed, for example, of a liquid crystal device (LCD). Moreover, for exchanging the display of remaining money amount over those IC cards which are inserted, the check button 82 for the remaining money amount can be used in common. Namely, the display of the remaining amount is automatically and cyclically exchanged by every push of the check button 82. Alternatively, other push buttons can be added on the main body 10 of the portable terminal device for that purpose or operation.

Figure 7:
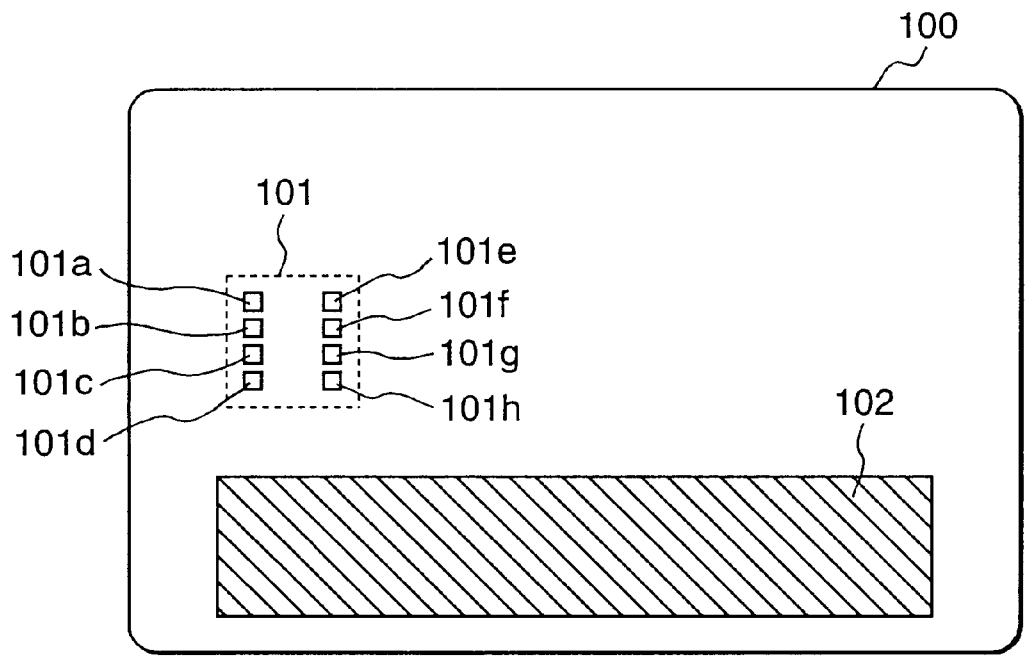
FIG. 7 is a top plane view of the electronic money IC card.

In FIG. 1, there are also shown the plural number (in the embodiment, three pieces of cards) of the electronic money IC cards 100, 110 and 120, with respective main surfaces thereof provided with contact portions 101, 111 and 121 at predetermined position thereof, for electrical connection. Further in FIG. 7, there is shown the structure of the electronic money IC cards 100 in more detail, and as is clear from the drawing, in the present embodiment, each of those contact portions 101, 111 and 121 is composed of a group of eight contacting points 101a through 101h. Further in the drawing, a reference numeral 102 shows an emboss portion, in which, for example, a name and/or a mark of a bank and/or a company which issues the electronic money IC card are/is pressed or formed in relief.

Further, though not shown in the drawings, for example, accessories such as a ten key pad, a button for money transfer and so on can be provided on the main body 10 of the of the portable terminal device, thereby to make it possible to transfer a desired amount of the electronic money from one electronic money IC card to an another electronic money IC card, by designating or inputting the amount with those buttons on the portable terminal device. For example, with this, by inserting the respective electronic money IC cards owned by a father and his child or children into the slot opening 12 of the portable terminal device and by manipulating the above buttons thereof, it is possible to transfer the electronic money between them, i.e., the IC cards of father and his child or children. Also the transfer of the electronic money between the electronic money IC card owned by a friend can be possible in the same manner. Further, also in the same manner, the transfer of the electronic money is possible between the plural electronic money IC cards owned by the user himself, between the electronic money IC card for use in a bank saving account and that for paying for a consumption by him, for example.

Figure 2:
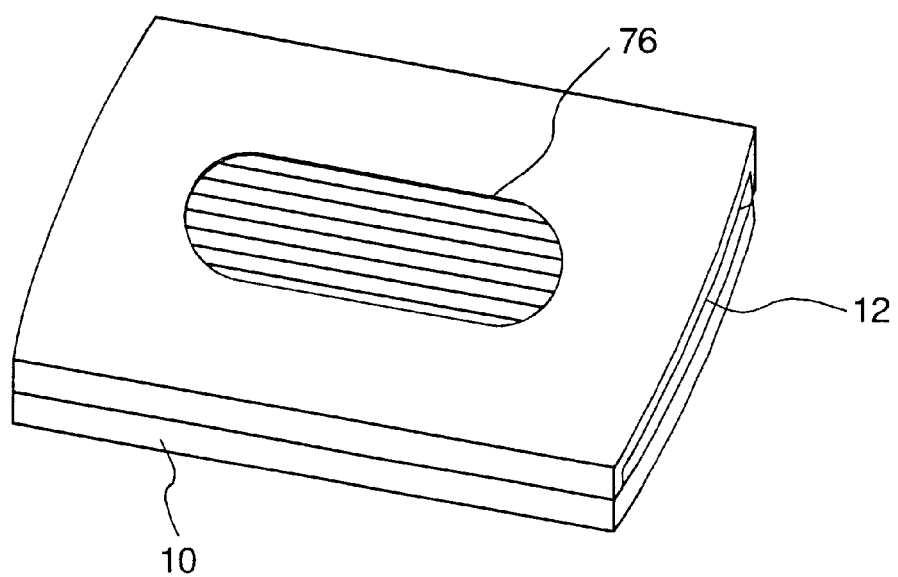
FIG. 2 is also a perspective view showing an external configuration of the portable terminal device for electronic money IC cards of the present invention from reverse side thereof.

FIG. 2 shows a perspective view of an external configuration of the portable terminal device for electronic money IC cards of the present invention from reverse side thereof. As is apparent from the drawing, on the reverse side surface wall of the main body 10 of the portable terminal device, there is provided an opening of an oval shape penetrating to the card slot opening 12. With this construction, when trying to take out the electronic money IC card(s) which is/are inserted into the slot opening 12, it/they can be easily slid out from the slot opening 12 by pushing a finger (for example, a thumb) on and moving it aside.

Figure 3:
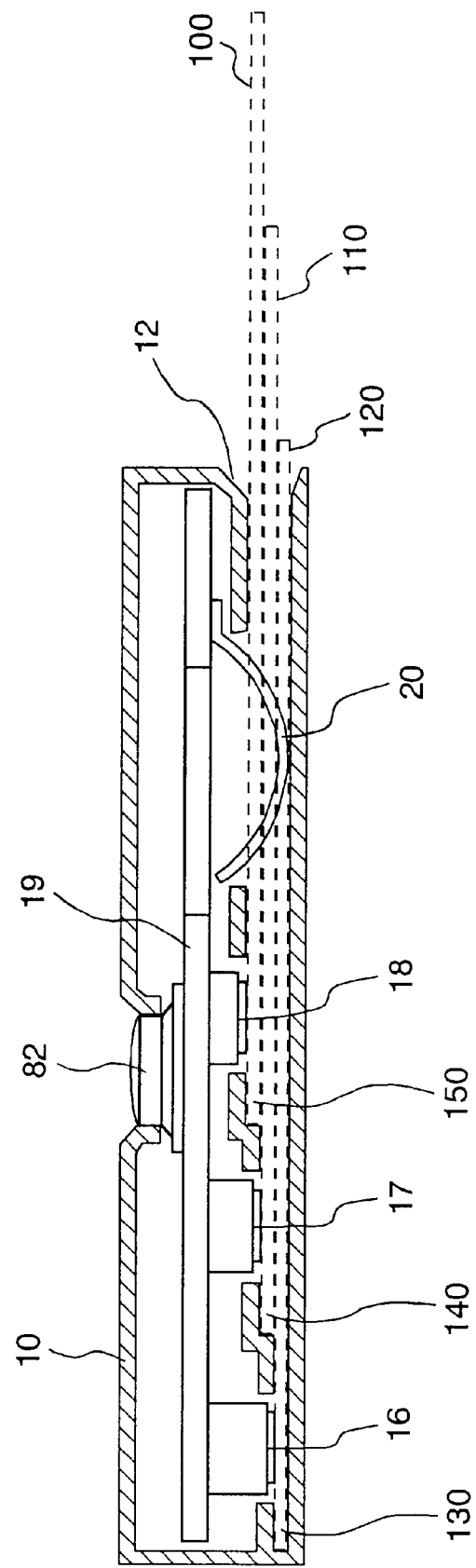
FIG. 3 is a cross-section view of the portable terminal device for electronic money IC cards of the first embodiment in accordance with the present invention.

In FIG. 3 showing the cross-section view of the portable terminal device for electronic money IC cards in accordance with the first embodiment of the present invention Only one substrate 19 is positioned inside of the main body 10 of the device, on the surface of which are provided a plurality of electric contact terminals 16, 17 and 18. On the surface of the substrate 19, not shown in the drawing, however, there are also mounted various circuitry elements including a micro-processor, memory device, etc., which are necessary for carrying out processing and displaying of the portable terminal device for electronic money IC cards. Further, the plural electronic money IC cards 100, 110 and 120 (three pieces of IC cards, in the present embodiment) are inserted into the slot opening 12 of the main body 10 of the device, as depicted by broken lines, with such plural cards being closely piled up with each other and shifted to each other by a predetermined distance d in the longitudinal direction on the main surface of the IC card. Here, the predetermined distance d corresponds to the length from a front edge portion up to the contact portion 101 of the electronic money IC card 100.

Figure 8:
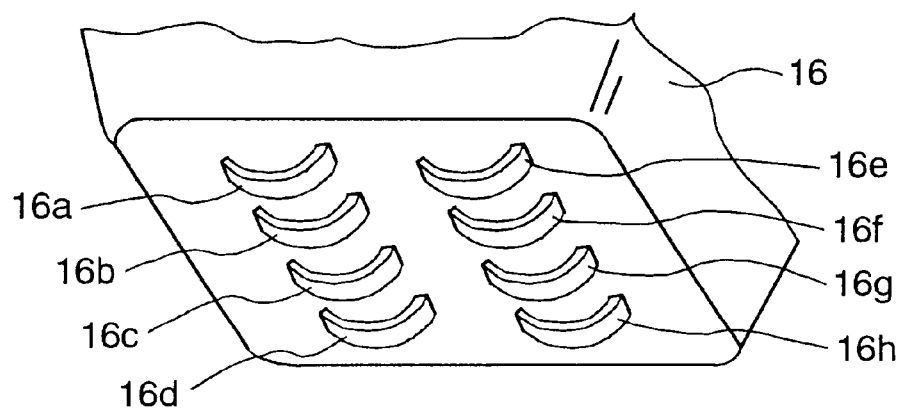
FIG. 8 is an enlarged perspective view from below of the electric contact terminal of the portable terminal device for electronic money IC cards for showing the details thereof.

On a bottom face of each of those plural electric contact terminals 16, 17 and 18, as clearly shown in attached FIG. 8, eight spring terminal pins of "U" shape are provided corresponding to the eight contact points 101a through 101h of the contact portion 101 of the electronic money IC card 100. Though the transfer of the information of electronic money between the electronic money IC card 100 is established through electrical connection therebetween in the embodiment mentioned above, practice of the present invention is not restricted only to this, however, it also can be established optically through an optical coupling therebetween.

In the construction of the portable terminal device for electronic money IC cards mentioned above, the electric contact terminals 16, 17 and 18 are connected with the electric contact portions 101, 111 and 121 of the plural IC cards 100, 110 and 120 which are inserted into the slot openings, respectively. Namely, those electric contact terminals 16, 17 and 18 of the substrate 19 are so constructed that the height of them are gradually decreased from a left-hand side to a right-hand side on the drawing. Under the condition of this, the portable terminal device is able to read out the respective contents of the electronic money IC cards inserted and to write into them. Also, as is apparent from the drawing, a guide member 20 which is bent or wound in "U" shape and made of spring material is provided in the main body 10, with which the plural IC cards 100, 110 and 120 being inserted from the slot opening 12 are guided in the order of the insertion to the predetermined positions 130, 140 and 150, i.e., from the bottom to the top in the slot opening 12.

In this manner, the electric contact terminals 16, 17 and 18 are positioned on the surface of the same substrate 19 within the card slot opening 12 and the plural IC cards are inserted under the condition that they are piled up with and shifted with respect to each other. Therefore, it is possible to reduce the thickness of the device itself and to obtain a small-sized portable terminal device for electronic money IC cards as a whole. However, with the portable terminal device for electronic money IC cards of the present embodiment mentioned above, as shown in the drawing, the second IC card and the third IC card are inserted with the rear edge portions thereof projecting from the slot opening 12, and the length of the device is nearly equal to that of IC card in the direction of insertion thereof.

Figure 4:
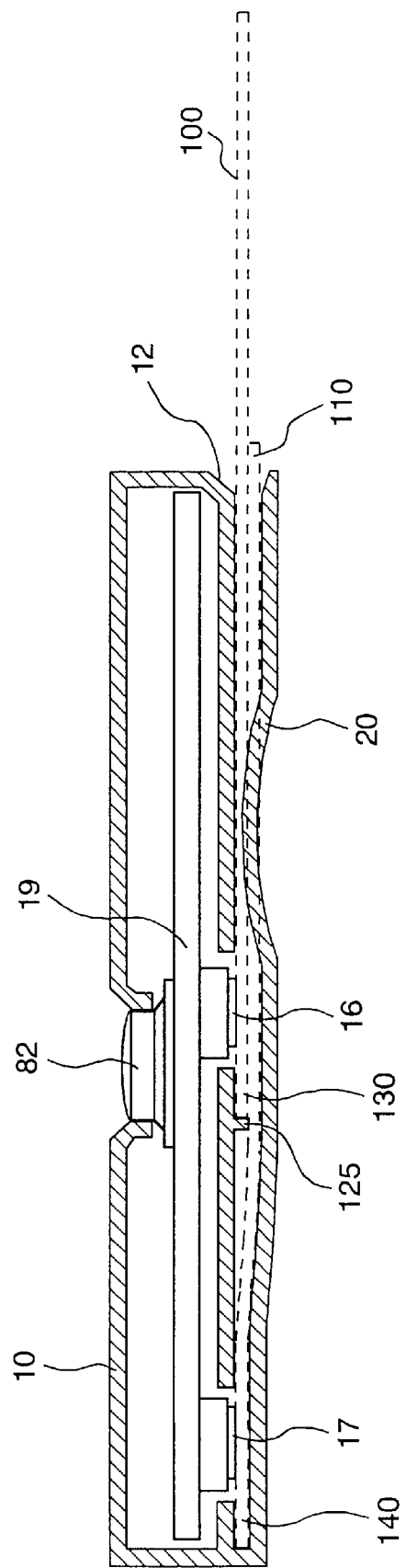
FIG. 4 is a cross-section view of the portable terminal device for electronic money IC cards of a second embodiment in accordance with the present invention.

FIG. 4 is a cross-section view of the portable terminal device for electronic money IC cards of a second embodiment in accordance with the present invention. As apparent from the drawing, there is positioned the only one substrate 19 on the surface of which the electric contact terminals 16 and 17 are provided, in the main body 10 of the device. Also in the present second embodiment, the plurality (however, only two pieces in the present embodiment) of the IC cards 100 and 110 are inserted with being piled up and shifted aside to each other in the slot opening 12 of the main body 10 of the device. Further, the electric contact terminals 16 and 17 of the substrate 19 are connected with the electric contact portions 101 and 111 of the IC cards 100 and 110, and under the condition of this, the portable terminal device can read out the respective contents of the inserted two pieces of the IC cards and/or write them therein.

Furthermore, with the present second embodiment, a portion of a the wall surface of flexible plastic material for example, which defines the bottom surface of the portable terminal device, is formed or wound in "U" shape directing into the slot opening 12 so as to form the guide member 20. However, the guide member 20 can be separately structured with another materials, as shown in FIG. 3 mentioned above. With the guide member 20, the IC cards being inserted is pushed upward therewith, thereby, those two IC cards 100 and 110 are guided into the slot opening 12, in the order of insertion, from the top to the bottom, while being piled up and shifted aside to each other, as shown by the broken lines in the drawing.

Further, in the present second embodiment, in the slot opening 12 formed in the main body 10 of the device, a convex portion 125 is formed projecting into the opening with a height equal to the thickness of the IC card. Therefore, as shown by the broken lines in the drawing, the first IC card 100 which is inserted first is guided and inserted into the upper portion by the function of the guide member 20 mentioned above, and is stopped by abutting at the front end portion thereof with the convex portion 125 and positioned in the predetermined position 130. Next, when the second IC card 110 is inserted into the slot opening 12, as also shown by the broken lines in the drawing, it proceeds along with the bottom surface of the IC card 100 mentioned above and rides over the convex portion 125 to be positioned in the predetermined position 140 with bending a little bit.

In this manner, in accordance with the portable terminal device of the second embodiment, the electric contact terminals 16 and 17 are positioned on the surface of the same substrate 19 within the card slot opening 12 and the plural IC cards are inserted under the condition that they are piled up with and sifted aside to each other. Therefore, it is possible to reduce the thickness of the device itself and to obtain a small-sized portable terminal device for electronic money IC cards as a whole. However, with the portable terminal device for electronic money IC cards of the present embodiment mentioned above, as shown in the drawing, the second IC card is inserted and positioned while projecting from the rear edge portion thereof from the slot opening 12, and the length of the device is nearly equal to that of an IC card in the direction of insertion thereof.

Figure 5:
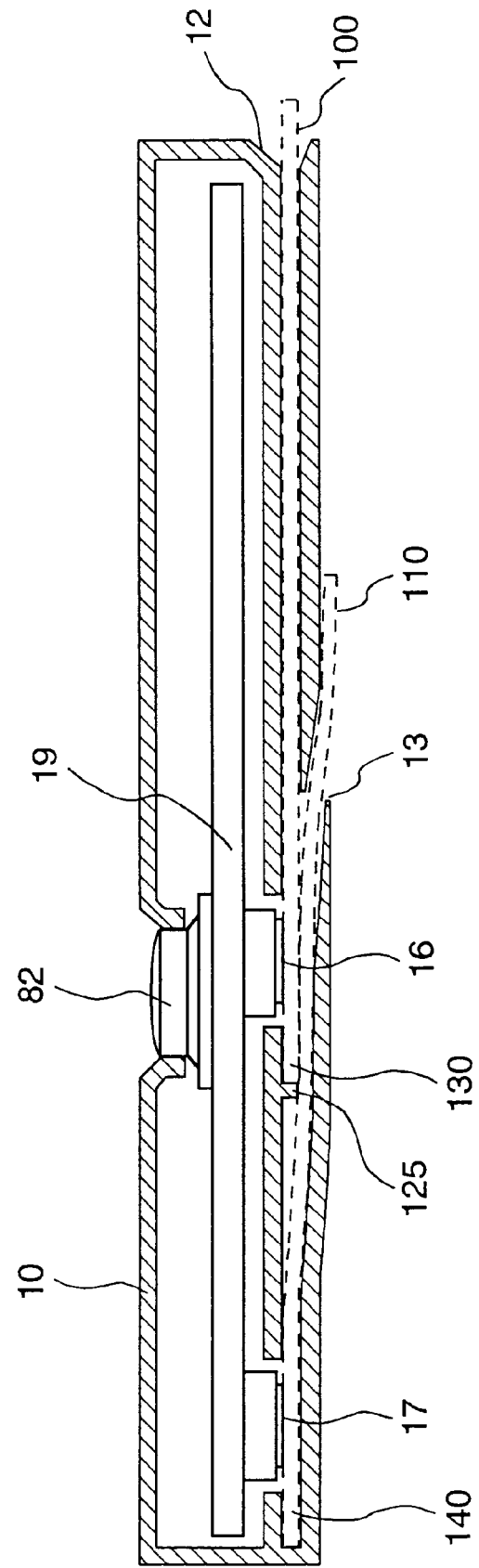
FIG. 5 is a cross-section view of the portable terminal device for electronic money IC cards of a third embodiment in accordance with the present invention.

FIG. 5 is a cross-section view showing internal construction of the portable terminal device for electronic money IC cards of a third embodiment in accordance with the present invention, and as is apparent from the drawing, the main body 10 of the portable terminal device has a plurality of (two) cord slot openings 12 and 13 respectively for a plurality of (two pieces of) IC cards which are to be inserted therein. However, the second slot opening 13 is provided on the reverse side surface of the main body 10 of the device of the box-type, and it is connected to the first slot opening 12 in a portion thereof to each other. Further, inside of the main body 10 of the device is also positioned the substrate 19, on the surface of which the electric contact terminals 16 and 17 of the device side are provided. However, in accordance with the third embodiment, the two pieces of the IC cards, which are inserted into the first and second slot openings 12 and 13 respectively, are positioned in the portable terminal device, while being closely positioned and piled up with and sifted aside to each other. Namely, the first IC card 100 inserted from the slot opening 12 is guided to the predetermined position 130 and is stopped by abutting at the front edge thereof with the convex portion 125 mentioned above. On the other hand, the second IC card 110 inserted from the slot opening 13 is guided at the front edge portion thereof by the IC card 100 which is already inserted into the slot opening 12, into the predetermined position 140.

Also, in the portable terminal device for electronic money IC cards in accordance with the third embodiment, under the condition that those two IC cards 100 and 110 are inserted into the slot openings 12 and 13 in the manner as mentioned above, the contact portions 101 and 111 are connected with the contact terminals 16 and 17 on the substrate 19, thereby enabling the portable device to read out the contents of the two IC cards and to write them therein. With the portable terminal device of the third embodiment, only two slot openings 12 and 13 are provided, however, another slot opening also can be added.

In this manner, also in accordance with the portable terminal device for electronic money IC cards of the third embodiment, since the electric contact terminals 16 and 17 are positioned on the surface of the same substrate 19 within the card slot opening 12 and the plural IC cards are inserted under the condition that they are piled up with and sifted aside to each other, therefore, it is possible to reduce the thickness of the device itself and to obtain a small-sized portable terminal device for electronic money IC cards as a whole. Especially, in accordance with the portable terminal device for electronic money IC cards of the third embodiment, since the second IC card 110 which is inserted afterward into the slot opening 13 does not extend it outside of the device at the rear edge portion thereof, therefore, it is very convenient for the user to operate and manipulate it.

Figure 6:
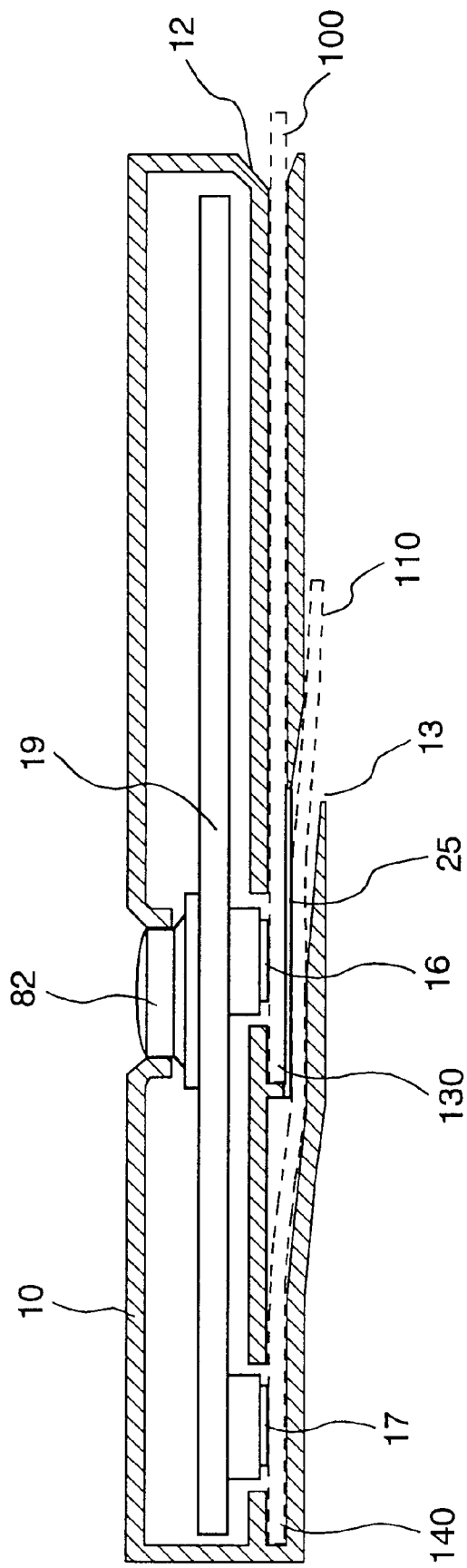
FIG. 6 is a cross-section view of the portable terminal device for electronic money IC cards of a variation of the third embodiment in accordance with the present invention.

FIG. 6 shows the portable terminal device for electronic money IC cards of a variation of the third embodiment mentioned above, in accordance with the present invention. As is apparent from the drawing, the main body 10 of the portable terminal device has also a plurality (two) of card slot openings 12 and 13 respectively for receiving the plurality of (two pieces of) IC cards which are inserted therein. However, the second slot opening 13 is provided on the reverse side surface of the main body 10 of the device of the box-type, and it is separately defined from the first slot opening 12 by a partition element 25. Therefore, in accordance with the portable terminal device of the above variation, being different from the third embodiment shown in FIG. 5, there is no requirement as to the order of insertion of the IC cards 100 and 110, i.e., first into the first slot opening 12 and then into the second slot opening 13, therefore it is very easy for the user to handle and operate it.

Figure 9:
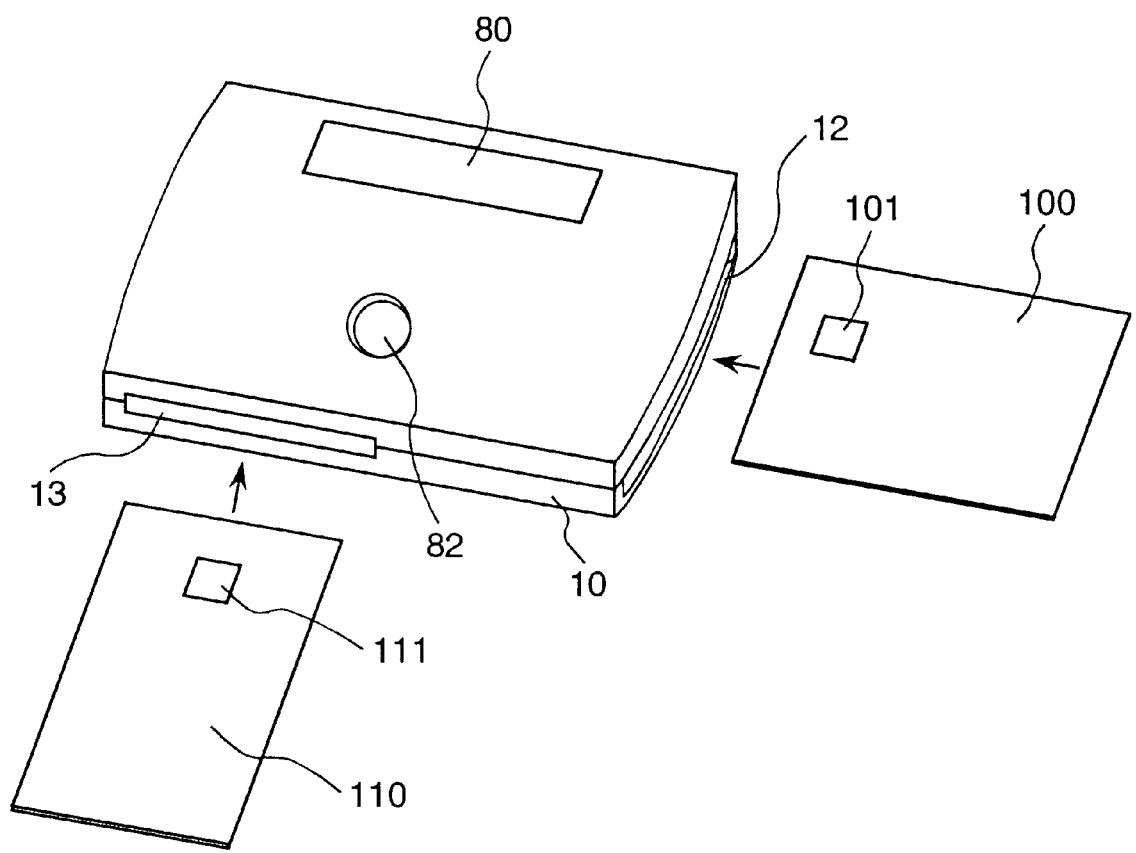
FIG. 9 is a perspective view showing an external configuration of a portable terminal device for electronic money IC cards of a fourth embodiment in accordance with the present invention.

Though it is explained that the plurality of the IC cards are inserted into the portable terminal device, while being piled up with each other in the same direction in the embodiments mentioned above, the present invention is not limited thereto. In accordance with the present invention, it is also possible, as shown in FIG. 9, to provide the first slot opening 12 and the second slot opening 13 on the edge faces of the box-like terminal device which are perpendicular to each other.

Figure 10:
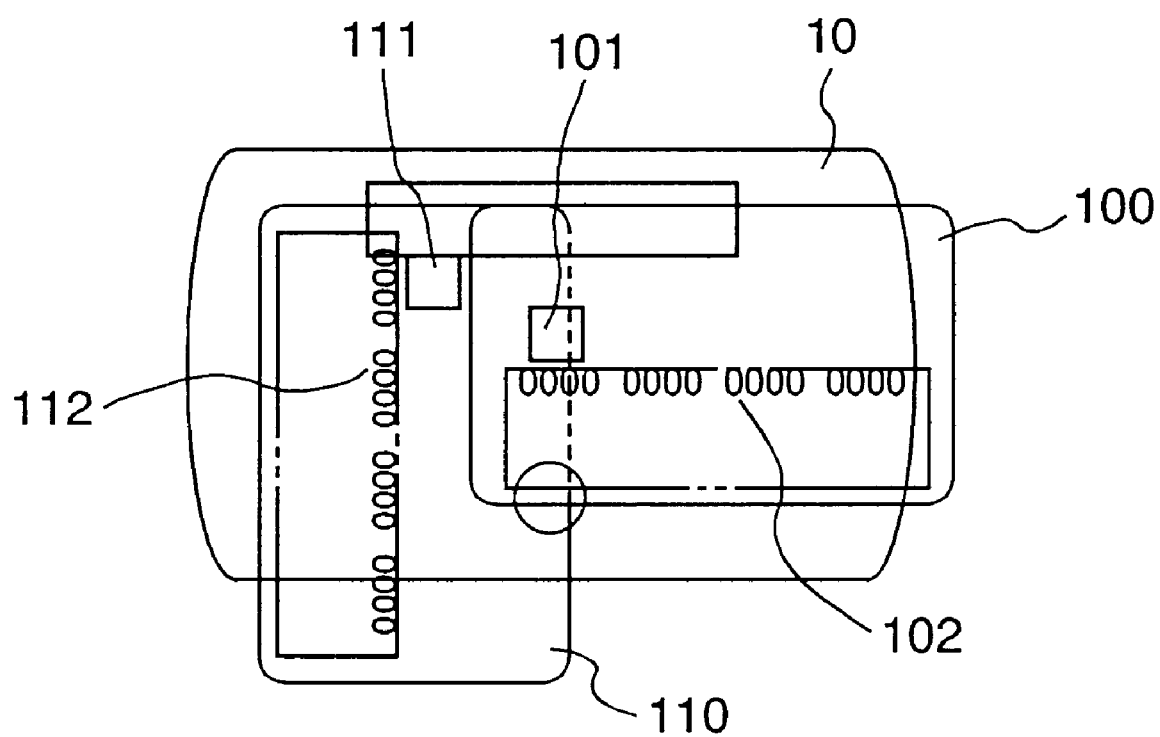
FIG. 10 is a top plane view showing the positions of the electronic money IC cards inside of the portable terminal device for electronic money IC cards.

With such construction, in which those two IC cards 100 and 110 are inserted into the main body 10 of the device, while being piled up to each other and in perpendicular to each other, as shown in FIG. 10, the emboss portions 102 and 112 of those two IC cards (see FIG. 7) do not overlap on each other. Therefore, such embossed portions are protected from being worn out by touching to each other, and it is preferable for thinning the thickness of the device.

Figure 11:
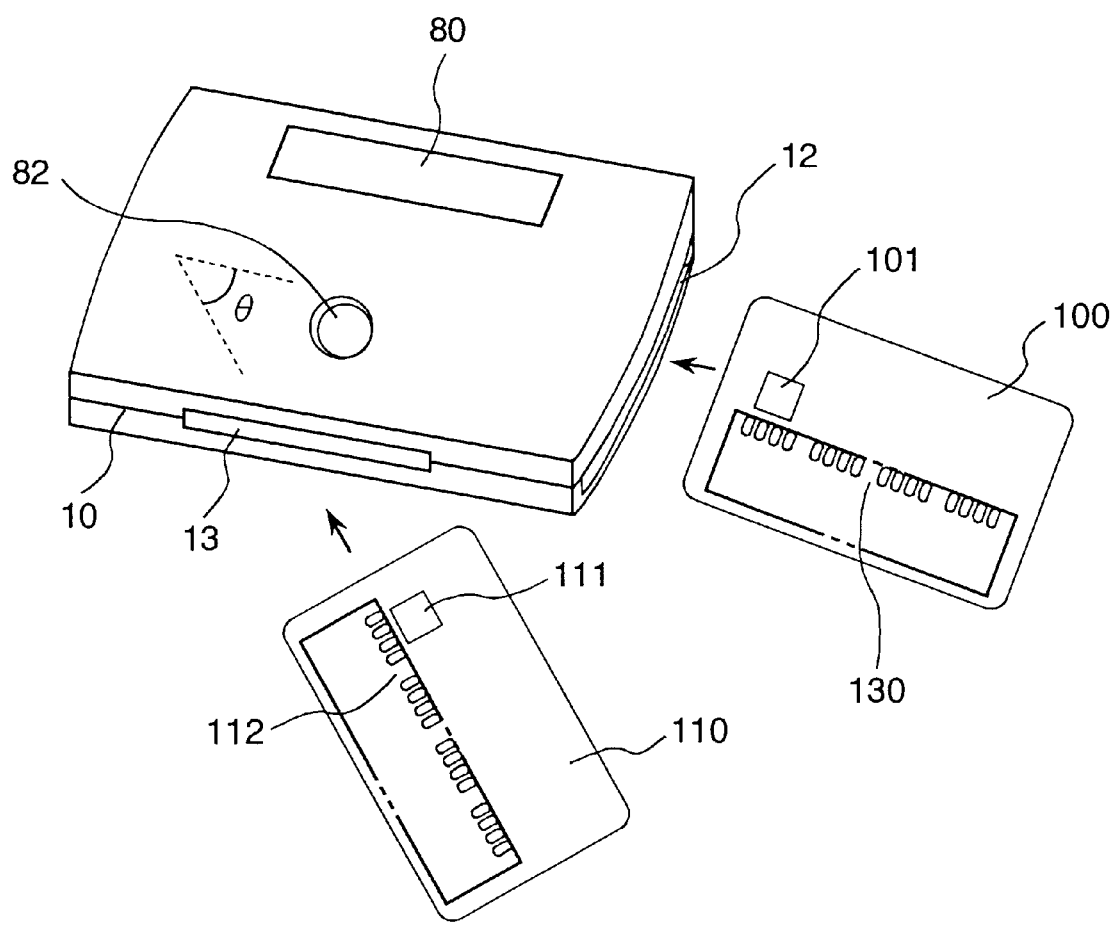
FIG. 11 is a perspective view showing an external configuration of a portable terminal device for electronic money IC cards of a fifth embodiment in accordance with the present invention.
Figure 12:
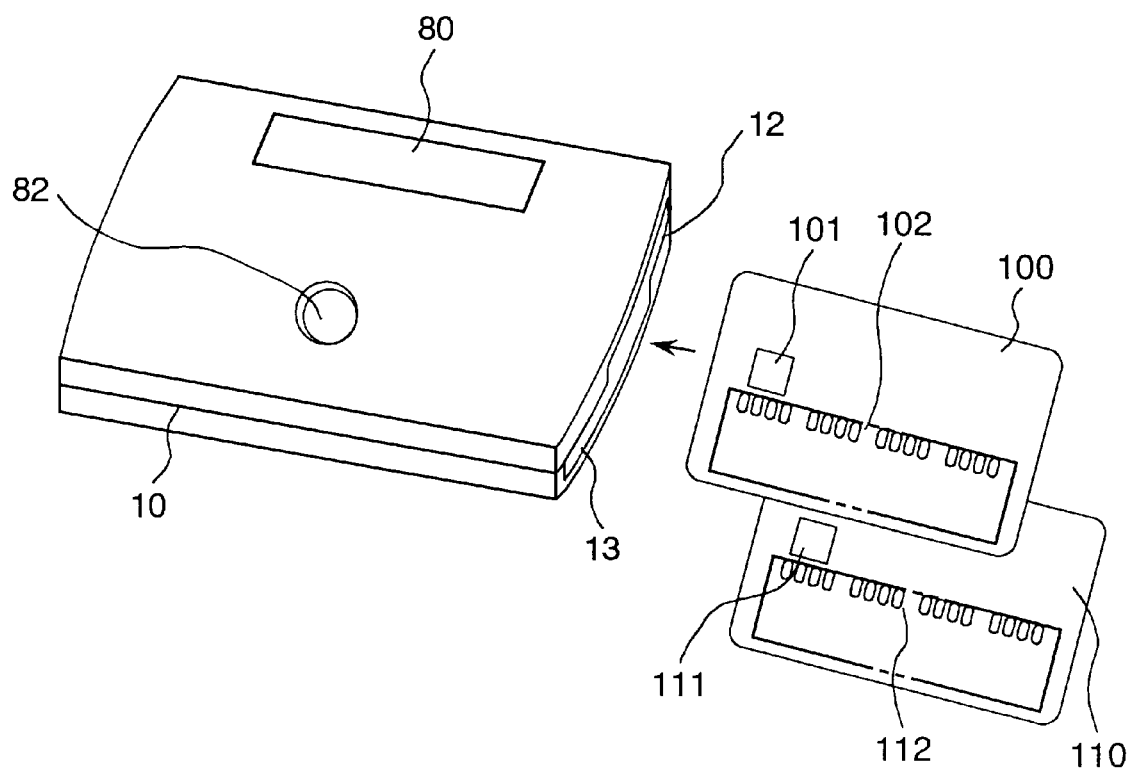
FIG. 12 is a perspective view showing an external configuration of a portable terminal device for electronic money IC cards of a sixth embodiment in accordance with the present invention.

Further, it is also possible to be constructed such that, as shown in FIG. 11, those two IC cards 100 and 110 are inserted into the main body 10 of the device while defining an angle θ less than 90° with each other and being piled up. Moreover, it is also possible to be constructed such that, as shown in FIG. 12, those two slot openings 102 and 103 for the IC cards 100 and 110 are positioned while being sifted to each other in the direction perpendicular to that of insertion of the IC cards 100 and 110. And with those constructions of the portable terminal devices, it is also possible to obtain such effect that the IC card can be protected from the wear out of the emboss portion thereof and that it is preferable for thinning the thickness of the device.

What is claimed is:

1. A portable terminal device for electronic money IC cards containing monetary data therein, comprising:

a card slot opening into which a plurality of electronic money IC cards are inserted;

means for reading and writing the monetary data from and into said electronic money IC cards which are inserted into the card slot opening;

means for displaying money amount of the monetary date which is read out from said inserted electronic money IC cards or which is to be written into said inserted electronic money IC cards; and means for manipulating the reading and writing operations of the monetary data from and into said electronic money IC cards which are inserted into the card slot opening;

wherein said card slot opening is so configured that the plurality of said electronic money IC cards are inserted into and positioned while being closely piled up with each other and shifted to each other in a direction parallel to main surface thereof;

wherein said means for reading and writing the monetary data from and into said electronic money IC cards which are inserted are in plural and are positioned separately on a surface of a same substrate; and wherein said plural means for reading and writing the monetary data from and into said electronic money IC cards which inserted are into the card slot opening, are positioned at a same height on the surface of the substrate, and further is provided means for bending at least one of said electronic money IC cards within said card slot opening.

2. A portable terminal device for electronic money IC cards as defined in claim 1, wherein said card slot opening is a single slot opening.

3. A portable terminal device for electronic money IC cards as defined in claim 2, wherein a convex portion is provided within said card slot opening so as to position said electronic money IC cards in an overlapping shifted relationship with respect to each other.

4. A portable terminal device for electronic money IC cards as defined in claim 1, wherein said card slot opening is provided in plural while being closely piled up with each other.

5. A portable terminal device for electronic money IC cards as defined in claim 4, wherein said plural card slot openings are provided on a same side edge portion of the device.

6. A portable terminal device for electronic money IC cards as defined in claim 4, wherein said plural card slot openings are provided on different side edge portions of the device.

7. A portable terminal device for electronic money IC cards as defined in claim 1, wherein at least an opening is provided in a portion of an outside surface wall of the device which defines said card slot opening of the device, so as to allow a user to push out the electronic money IC cards inserted into said card slot opening.

8. A portable terminal device for electronic money IC cards containing monetary data therein, comprising:

at least one card slot opening, wherein a plurality of said electronic money IC cards can be at least partially inserted into said device;

a plurality of interface arrangements, each providing interface and communication with a respective electronic money IC card of said plurality of said electronic money IC cards in substantially a same plane as other ones of said plurality of interface arrangements; and a bending arrangement constructed to bend an electronic money IC card with insertion into said device, such that an interface portion of said electronic money IC card interfaces with a corresponding interface arrangement in substantially a same plane as other ones of said plurality of interface arrangements.

9. A portable terminal device for electronic money IC cards as defined in claim 8, wherein said at least one card slot opening is a single card slot opening for common insertion of said plurality of said electronic money IC cards such that portions of said plurality of said electronic money IC cards lay in parallel with one another, and wherein said bending arrangement bends a differing portion of said electronic money IC card around an adjacent electronic money IC card with insertion into said device, such that said interface portion of said electronic money IC card interfaces with a corresponding interface arrangement in substantially a same plane as other ones of said plurality of interface arrangements.

10. A portable terminal device for electronic money IC cards as defined in claim 8, wherein said at least one card slot opening is a single card slot opening for common insertion of said plurality of said electronic money IC cards such that portions of said plurality of said electronic money IC cards contact in parallel with one another, and wherein said bending arrangement bends a differing portion of said electronic money IC card around an adjacent electronic money IC card with insertion into said device, such that said interface portion of said electronic money IC card interfaces with a corresponding interface arrangement in substantially a same plane as other ones of said plurality of interface arrangements.

11. A portable terminal device for electronic money IC cards as defined in claim 8, wherein said at least one card slot opening is a plurality of card slot openings for insertion of said plurality of said electronic money IC cards, and wherein said bending arrangement bends a portion of said electronic money IC card around an adjacent electronic money IC card with insertion into said device, such that said interface portion of said electronic money IC card interfaces with a corresponding interface arrangement in substantially a same plane as other ones of said plurality of interface arrangements.

12. A portable terminal device for electronic money IC cards as defined in claim 11, wherein said plurality of card slot openings for insertion of said plurality of said electronic money IC cards, are provided on a same side of said device.

13. A portable terminal device for electronic money IC cards as defined in claim 11, wherein said plurality of card slot openings for insertion of said plurality of said electronic money IC cards, are provided on adjacent sides of said device.

* * * * *